United States Patent Office 3,141,025
Patented July 14, 1964

3,141,025
17α-ETHYNYL-10β-PROPYL-Δ$^{4,9(11)}$-ESTRADIENE-17β-OL-3-ONE AND ITS PREPARATION
Gérard Nominé, Noisy-le-Sec, Robert Bucourt, Clichys-sous-Bois, and André Pierdet, Noisy-le-Sec, France, assignors to Roussel-UCLAF, S.A., Paris, France, a corporation of France
No Drawing. Filed July 18, 1962, Ser. No. 210,815
Claims priority, application France Aug. 18, 1961
16 Claims. (Cl. 260—340.9)

The invention relates to the novel products, 17α-ethynyl-10β-propyl-Δ$^{4,9(11)}$-estradiene-17β-ol-3-one having the formula

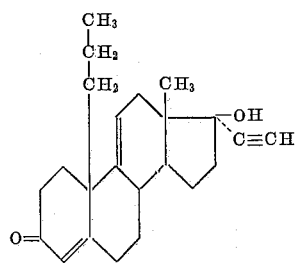

(I)

The invention also relates to a novel process for the preparation of the said novel product and to novel intermediates formed therein.

17α - ethynyl - 10β - propyl-Δ$^{4,9(11)}$-estradiene-17β-ol-3-one possesses useful physiological properties, particularly progestomimetic activity, and can be administered orally.

It is an object of the invention to provide the novel product, 17α - ethynyl-10β-propyl-Δ$^{4,9(11)}$-estradiene-17β-ol-3-one.

It is another object of the invention to provide a novel process for the preparation of 17α-ethynyl-10β-propyl-Δ$^{4,9(11)}$-estradiene-17β-ol-3-one.

It is a further object of the invention to provide novel intermediates for 17α - ethynyl-10β-propyl-Δ$^{4,9(11)}$-estradiene-17β-ol-3-one.

These and other objects and advantages of the invention will become obvious from the following detailed description.

The novel product of the invention, 17α-ethynyl-10β-propyl-Δ$^{4,9(11)}$-estradiene-17β-ol-3-one has the structural formula

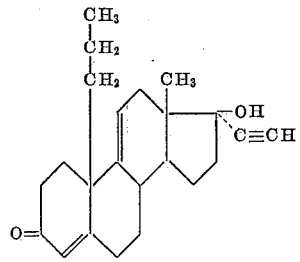

The process of the invention for the preparation of 17α-ethynyl - 10β-propyl-Δ$^{4,9(11)}$-estradiene-17β-ol-3-one comprises catalytically hydrogenating 3-lower alkylenedioxy-17β - acyloxy - 10β - allyl - 4,5 - seco - Δ$^{9(11)}$-estrene-5-one wherein the acyl radical is derived from an organic carboxylic acid having 1 to 18 carbon atoms to form 3-lower alkylenedioxy - 17β - acyloxy - 10β-propyl-4,5-seco-Δ$^{9(11)}$-estrene-5-one, hydrolyzing the latter under acidic conditions to form 17β - acyloxy - 10β-propyl-4,5-seco-Δ$^{9(11)}$-estrene-3,5-dione, simultaneously cyclizing and saponifying the latter under alkaline conditions to form 10β-propyl-Δ$^{4,9(11)}$-estradiene-17β-ol-3-one, oxidizing the latter to form 10β-propyl-Δ$^{4,9(11)}$-estradiene-3,17-dione, reacting the latter with a lower alkyl orthoformate to form 3-lower alkoxy - 10β-propyl-Δ$^{3,5,9(11)}$-estratriene-17-one, reacting the latter with an ethynylation agent to form 3-lower alkoxy - 10β-propyl-17α-ethynyl-Δ$^{3,5,9(11)}$-estratriene-17β-ol, hydrolyzing the latter under acid conditions to form 17α - ethynyl - 10β-propyl-Δ$^{4,9(11)}$-estradiene-17β-ol-3-one and recovering the latter.

A preferred mode of the process of the invention for the preparation of 17α-ethynyl-10β-propyl-Δ$^{4,9(11)}$-estradiene-17β-ol-3-one comprises catalytically hydrogenating 3 - ethylenedioxy - 17β - benzoyloxy - 10β - allyl-4,5-seco-Δ$^{9(11)}$-estrene-5-one in the presence of a palladium catalyst such as palladized carbon black to form 3-ethylenedioxy-17β - benzoyloxy-10β-propyl-4,5-seco-Δ$^{9(11)}$-estrene-5-one, hydrolyzing the latter in the presence of an organic acid such as acetic acid to form 17β-benzoyloxy-10β-propyl-4,5-seco-Δ$^{9(11)}$-estrene-3,5-dione, simultaneously cyclizing and saponifying the latter in the presence of an alkali metal hydroxide in a lower alkanol such as potassium hydroxide in methanol to form 10β-propyl-Δ$^{4,9(11)}$-estradiene-17β-ol-3-one, oxidizing the latter with chromium trioxide to form 10β-propyl-Δ$^{4,9(11)}$-estradiene-3,17-dione, reacting the latter with ethyl orthoformate in the presence of p-toluene sulfonic acid to form 3-ethoxy-10β-propyl-Δ$^{3,5,9(11)}$-estratriene-17-one, reacting the latter with an alkali metal acetylide such as potassium acetylide to form 3 - ethoxy - 17α - ethynyl-10β-propyl-Δ$^{3,5,9(11)}$-estratriene-17β-ol, hydrolyzing the latter with a mineral acid such as hydrochloric acid to form 17α-ethynyl-10β-propyl-Δ$^{4,9(11)}$-estradiene-17β-ol-3-one and recovering the latter. The reaction scheme is illustrated in Table I.

TABLE I

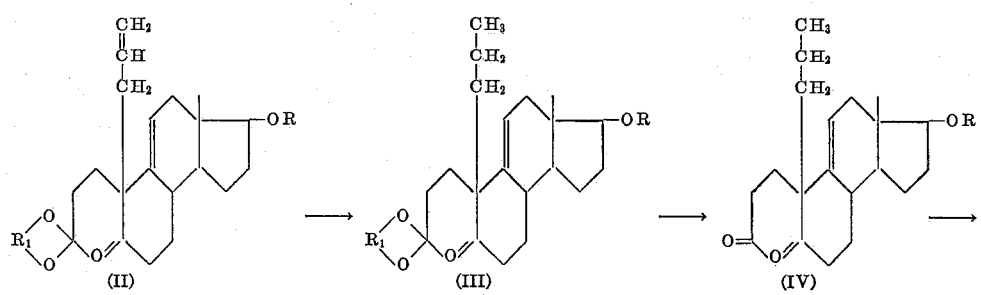

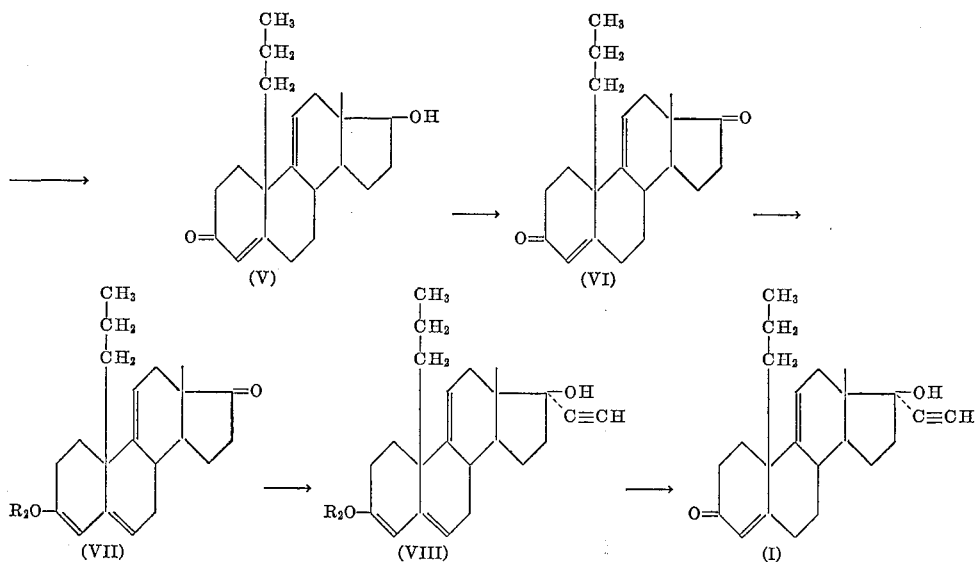

wherein R is an acyl radical of an organic carboxylic acid having 1 to 18 carbon atoms, $R_1$ is a lower alkylene radical and $R_2$ is a lower alkyl radical having 1 to 7 carbon atoms.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelargonic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenyl acetic acid and phenyl propionic acid; aryl carboxylic acids such as benzoic acid and 2,4-dinitrobenzoic acid; phenoxy alkanoic acids such as phenoxy acetic acid, p-chlorophenoxy acetic acid, 2,4-dichlorophenoxy acetic acid, 4-ter-butyl-phenoxy acetic acid, 3-phenoxy propionic acid and 4-phenoxy butyric acid; heterocyclic carboxylic acids such as furane-2-carboxylic acid, 5-ter-butylfurane-2-carboxylic acid, 5-bromofurane-2-carboxylic acid and nicotinic acids; β-ketoalkanoic acids, such as acetylacetic acid, propionylacetic acid and butyrylacetic acid; amino acids such as diethylaminoacetic acid and aspartic acid.

The 3-lower alkylenedioxy-17β-acyloxy-10β-allyl-4,5-seco-$\Delta^{4,9(11)}$-estrene-5-ones which are the starting materials for the process of the invention are prepared by allylation of the corresponding 3-lower alklenedioxy-17β-acyloxy-4,5-seco-$\Delta^{9(10)}$-estrene-5-ones, the latter being prepared according to U.S. patent application serial number 83,381, filed January 18, 1961, now Patent No. 3,117,979.

In the following examples there are described several preferred embodiments to illustrate the invention. However, it should be understood that the invention is not intended to be limited to the specific embodiments.

EXAMPLE I

*Preparation of 3-Ethylenedioxy-17β-Benzoyloxy-10β-Allyl-4,5-Seco-$\Delta^{9(11)}$-Estrene-5-One*

4.5 g. of 3-ethylenedioxy-17β - benzoyloxy - 4,5 - seco-$\Delta^{9(10)}$-estrene-5-one (obtained according to U.S. patent application Serial Number 83,381) dissolved in 45 cc. of anhydrous toluene were introduced into 13 cc. of a solution of N potassium teramylate in toluene and the reaction mixture was heated for several minutes. Then, drop by drop, a solution of 5 cc. of allyl bromide in 15 cc. of toluene were introduced and the reaction mixture was allowed to stand at room temperature for a period of 3 hours. The reaction mixture was poured into water and extracted with ether. The ethereal extracts were washed with water, dried and evaporated to dryness under vacuum. The residue was subject to chromatography through magnesium silicate and eluted with methylene chloride containing 2% of ether. 3-ethylenedioxy-17β-benzoyloxy-10β-allyl-4,5-seco-$\Delta^{9(11)}$-estrene-5-one was obtained having a melting point of 128° C. and a specific rotation $[\alpha]_D^{20} = +60°\pm1°$ (c.=0.5% in methanol).

The product occurred in the form of white rodlets, and was soluble in alcohol, ether, acetone, benzene and chloroform, and insoluble in water.

*Analysis.*—$C_{30}H_{38}O_5$; molecular weight=478.60. Calculated: C, 75,28%; H, 8.00%. Found: C, 75.1%; H, 7.9.

EXAMPLE II

*Preparation of 17α-Ethynyl-10β-Propyl-$\Delta^{4,9(11)}$-Estradiene-17β-Ol-3-One*

STEP A.—3-ETHYLYENEDIOXY-17β-BENZOYLOXY-10β-PROPYL-4,5-SECO-$\Delta^{9(11)}$-ESTRENE-5-ONE 100 mg. of 3-ethylenedioxy-17β-benzoyloxy-10β-allyl-4,5-seco-$\Delta^{9(11)}$-estrene-5-one were introduced into 10 cc. of ethyl acetate containing 1% of triethylamine and 10 mg. of palladized carbon black containing 15% of palladium were added. The reaction mixture was hydrogenated for a period of 15 minutes. Then the catalyst was filtered and the filtrate was then evaporated to dryness under vacuum. The residue was crystallized from methanol and furnished 3-ethylenedioxy-17β-benzoyloxy-10β-propyl-4,5-seco-$\Delta^{9(11)}$-estrene-5-one having a melting point of 95° C. and a specific rotation $[\alpha]_D^{20} = +60°\pm1°$ (c.=0.6% in methanol).

The product occurred in the form of colorless prismatic crystals and was soluble in most of the usual organic solvents such as benzene, chloroform, alcohol, ether, acetone, and insoluble in water.

*Analysis.*—$C_{30}H_{40}O_5$; molecular weight=480.62. Calculated: C, 74.96%; H, 8.38%. Found: C, 74.8%; H, 8.3%.

STEP B.—17β-BENZOYLOXY-10β-PROPYL-4,5-SECO-$\Delta^{9(11)}$-ESTRENE-3,5-DIONE 1.4 g. of 3-ethylenedioxy-17β-benzoyloxy-10β-propyl-4,5-seco-$\Delta^{9(11)}$-estrene-5-one were introduced into 91 cc. of a 75% acetic acid solution under an atmosphere of nitrogen. The mixture was heated to 60° C. for a period of one hour and after cooling, the mixture was poured into water saturated with sodium bicarbonate and extracted with ether. The ethereal extracts were washed with water, dried, and evaporated to dryness under vacuum. The residue was crystallized from isopropyl ether and furnished 17$\beta$-benzoyloxy-10$\beta$-propyl-4,5 - seco-$\Delta^{9(11)}$-estrene-3,5-dione, having a melting point of 75–76° C. and a specific rotation $[\alpha]_D^{20} = +65° \pm 1°$ (c.=0.6% in methanol).

The product occurred in the form of white prismatic crystals, and was soluble in alcohol, ether, acetone, benzene and chloroform, and insoluble in water.

Analysis.—$C_{28}H_{36}O_4$; molecular weight=436.57. Calculated: C, 77.02%; H, 8.31%. Found: C, 77.1%; H, 8.1.

STEP C.—10$\beta$-PROPYL-$\Delta^{4,9(11)}$-ESTRADIENE-17$\beta$-OL-3-ONE 1.2 g. of 17$\beta$-benzoyloxy-10$\beta$-propyl-4,5-seco-$\Delta^{9(11)}$-estrene-3,5-dione were introduced into 120 cc. of a 0.5 N solution of potassium hydroxide in methanol under an atmosphere of nitrogen. The reaction mixture was heated to reflux for a period of one hour and then evaporated to dryness under vacuum. The residue was taken up in water and extracted with methylene chloride. The methylene chloride extracts were washed with water, dried and evaporated to dryness under vacuum. The residue was purified by subjecting it to chromatography through magnesium silicate and elution with methylene chloride containing 4% of ether. 10$\beta$-propyl-$\Delta^{4,9(11)}$-estradiene-17$\beta$-ol-3-one having a melting point of 125° C. and a specific rotation $[\alpha]_D^{20} = +87.5°$ C. (c.=0.6% in methanol) was obtained.

The product occurred in the form of white crystals soluble in alcohol, ether, benzene and chloroform and insoluble in water.

Analysis.—$C_{21}H_{30}O_2$; molecular weight=314.45. Calculated: C, 80.20%; H, 9.61%; O, 10.17%. Found: C, 80.0%; H, 9.4%; O, 10.4%.

U.V. spectra in ethanol: $\lambda_{max}$. 240–241 m$\mu$, $\epsilon$=16,450.

STEP D.—10$\beta$-PROPYL-$\Delta^{4,9(11)}$-ESTRADIENE-3,17-DIONE 1.625 g. of 10$\beta$-propyl-$\Delta^{4,9(11)}$-estradiene-17$\beta$-ol-3-one were dissolved in 200 cc. of acetic acid. Very slowly, 1 g. of chromium trioxide in solution in 10 cc. of 90% acetic acid was added and the reaction mixture was agitated at room temperature for a period of one hour and twenty minutes. 40 cc. of methanol was added thereto and the agitation was continued for another 15 minutes. Then the reaction mixture was poured into water saturated with sodium bicarbonate and the solution was extracted with ether. The ethereal extracts were washed with water, dried, and evaporated to dryness under vacuum. The residue consisted of 10$\beta$-propyl-$\Delta^{4,9(11)}$-estradiene-3,17-dione which was purified by chromatography through magnesium silicate and elution with methylene chloride containing 2% of acetone. A white crystalline product having a melting point of 120–122° C. and a specific rotation $[\alpha]_D^{20} = +194°$ C. (c.=0.7% in methanol) was obtained.

The product was soluble in ether, acetone, benzene and chloroform, slightly soluble in alcohol and insoluble in water.

Analysis.—$C_{21}H_{28}O_2$; molecular weight =312.43. Calculated: C, 80.72%; H, 9.03%. Found: C, 80.4%; H, 9.0%.

U.V. spectra in ethanol: $\lambda_{max}$. 241 m$\mu$, $\epsilon$=16,100.

STEP E.—3-ETHOXY-10$\beta$-PROPYL-$\Delta^{3,5,9(11)}$-ESTRATRIENE-17-ONE 400 mg. of 10$\beta$-propyl-$\Delta^{4,9(11)}$-estradiene-3,17-dione were dissolved in 2 cc. of hot ethanol containing 0.4 cc. of ethyl orthoformiate. Several drops of a solution of p-toluene sulfonic acid in ethanol were added and the reaction mixture was maintained at 70° C. under agitation in an atmosphere of nitrogen for a period of fifteen minutes. After the addition of several drops of triethylamine the reaction mixture was poured into water and the aqueous mixture was extracted with methylene chloride. The methylene chloride extracts were washed with water, dried and evaporated to dryness under vacuum. 480 mg. of raw 3-ethoxy-10$\beta$-propyl-$\Delta^{3,5,9(11)}$-estratriene-17-one were obtained.

The product, which is not described in the literature, was utilized as such for the next step.

Infrared spectra:
17-one at 1744 cm.$^{-1}$.
Enolic ether at 1655 and 1629 cm.$^{-1}$.

STEP F.—3-ETHOXY-17$\alpha$-ETHYNYL-10$\beta$-PROPYL-$\Delta^{3,5,9(11)}$-ESTRATRIENE-17$\beta$-OL 3 g. of potassium shavings were introduced in small amounts into a mixture of 30 cc. of ter-amyl alcohol and 12 cc. of benzene. The reaction mixture was agitated for a period of one hour in an atmosphere of nitrogen at 55–60° C. Then a stream of acetylene was passed therethrough and the agitation was continued for another two hours at 55–60° C.

The reaction mixture was cooled to room temperature and 460 mg. of 3-ethoxy-10$\beta$-propyl-$\Delta^{3,5,9(11)}$-estratriene-17-one were introduced. This material was obtained according to the preceding step and was in a solution of 12 cc. of benzene and 12 cc. of ether. The reaction mixture was agitated for a period of two hours at 25° C. under a stream of acetylene. 10 cc. of water were added to the reaction mixture, and the mixture was decanted. The organic phase was washed with water and with aqueous sodium bicarbonate, dried and evaporated to dryness under vacuum. 530 mg. of raw 3-ethoxy-10$\beta$-propyl-17$\alpha$-ethynyl-$\Delta^{3,5,9(11)}$-estratriene-17$\beta$-ol were obtained.

The product, which is not described in the literature, was utilized as such for the following step.

STEP G.—17$\alpha$-ETHYNYL-10$\beta$-PROPYL-$\Delta^{4,9(11)}$-ESTRADIENE-17$\beta$-OL-3-ONE 530 mg. of raw 3-ethoxy-17$\alpha$-ethynyl-10$\beta$-propyl-$\Delta^{3,5,9(11)}$-estratriene-17$\beta$-ol obtained according to the preceding step were dissolved in 7 cc. of hot ethanol under agitation in an atmosphere of nitrogen. 0.7 cc. of normal aqueous hydrochloric acid were added and the reaction mixture was heated to 50–60° C. for a period of five minutes. Then the reaction mixture was poured into water and the mixture was extracted with methylene chloride. The methylene chloride extracts were washed with water, dried, and evaporated to dryness under vacuum. 440 mg. of product were obtained which was subjected to chromatography through magnesium silicate. After crystallization from isopropyl ether, 190 mg. of 17$\alpha$-ethynyl-10$\beta$-propyl-$\Delta^{4,9(11)}$-estradiene-17$\beta$-ol-3-one having a melting point of 120° C., then 142–144° C. and a specific rotation $[\alpha]_D^{20} = 0°$ (c.=0.5% in methanol) were recovered. The product contained 11% of isopropyl ether of solvation.

The product occurred in the form of white prisms, insoluble in water and dilute aqueous acids and alkalis, slightly soluble in isopropyl ether, and solubel in alcohol, ether, acetone, benzene and chloroform.

Analysis.—$C_{23}H_{30}O_2$; molecular weight=338.47. Calculated: C, 81.61%; H, 8.93%. Found: C, 81.7%; H, 8.8%.

The product is not described in the literature.

Various modifications of the process of the invention may be made without departing from the spirit or scope thereof, and it is to be understood that the invention is intended to be limited only as defined in the appended claims.

We claim:
1. A compound having the formula

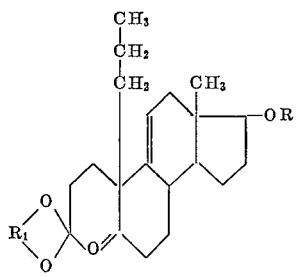

wherein R is an acyl radical of an organic carboxylic acid having 1 to 18 carbon atoms and $R_1$ is lower alkylene.

2. 3-ethylenedioxy - $17\beta$ - benzoyloxy-$10\beta$-propyl-4,5-seco-$\Delta^{9(11)}$-estrene-5-one.

3. A compound having the formula

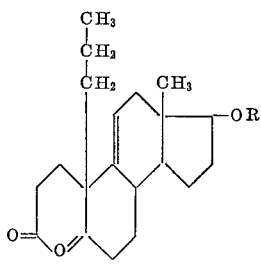

wherein R is an acyl radical of an organic carboxylic acid having 1 to 18 carbon atoms.

4. $17\beta$ - benzoyloxy - $10\beta$ - propyl-4,5-seco-$\Delta^{9(11)}$-estrene-3,5-dione.

5. A compound having the formula

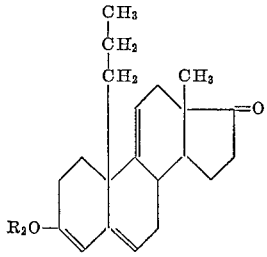

wherein $R_2$ is lower alkyl having 1 to 7 carbon atoms.

6. 3-ethoxy-$10\beta$-propyl-$\Delta^{3,5,9(11)}$-estratriene-17-one.

7. A compound having the formula

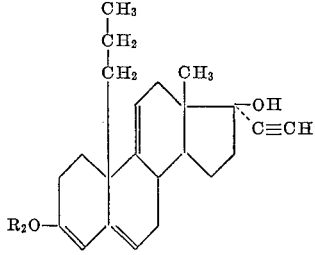

wherein $R_2$ is lower alkyl having 1 to 7 carbon atoms.

8. 3-ethoxy - $17\alpha$ - ethynyl-$10\beta$-propyl-$\Delta^{3,5,9(11)}$-estratriene-$17\beta$-ol.

9. A process for the preparation of $17\alpha$-ethynyl-$10\beta$-propyl-$\Delta^{4,9(11)}$-estradiene-$17\beta$-ol-3-one which comprises catalytically hydrogenating 3-lower alkylenedioxy-$17\beta$-acyloxy-$10\beta$-allyl-4,5-seco-$\Delta^{9(11)}$-estrene - 5 - one wherein the acyl radical is derived from an organic carboxylic acid having 1 to 18 carbon atoms in the presence of a palladium catalyst to form 3-lower alkylenedioxy-$17\beta$-acyloxy-$10\beta$-propyl-4,5-seco-$\Delta^{9(11)}$-estrene - 5 - one, hydrolyzing the latter under acidic conditions to form $17\beta$-acyloxy - $10\beta$ - propyl-4,5-seco-$\Delta^{9(11)}$-estrene-3,5-dione, simultaneously cyclizing and saponifying the latter in the presence of an alkali-metal hydroxide in a lower alkanol to form $10\beta$-propyl-$\Delta^{4,9(11)}$-estradiene-$17\beta$-ol-3-one, oxidizing the latter with chromium trioxide to form $10\beta$-propyl-$\Delta^{4,9(11)}$-estradiene-3,17-dione, reacting the latter with a lower alkyl orthoformate to form 3-lower alkoxy-$10\beta$-propyl-$\Delta^{3,5,9(11)}$-estratriene-17-one, reacting the latter with an alkali metal acetylide to form 3-lower alkoxy-$10\beta$-propyl-$17\alpha$-ethynyl-$\Delta^{3,5,9(11)}$-estratriene-$17\beta$-ol, hydrolyzing the latter under acid conditions to form $17\alpha$-ethynyl-$10\beta$-propyl-$\Delta^{4,9(11)}$-estradiene-$17\beta$-ol-3-one and recovering the latter.

10. The process of claim 9 wherein the catalytic hydrogenation is effected in the presence of palladized carbon black.

11. The process of claim 9 wherein the hydrolysis of the 3-lower alkylenedioxy-$17\beta$-acyloxy-$10\beta$-propyl-4,5-seco-$\Delta^{9(11)}$-estrene-5-one is effected in the presence of acetic acid.

12. The process of claim 9 wherein the simultaneous cyclization and saponification is effected with potassium hydroxide in methanol.

13. The process of claim 9 wherein the lower alkyl orthoformate is ethyl orthoformate and the reaction is effected in the presence of p-toluene sulfonic acid.

14. The process of claim 9 wherein the alkali metal acetylide is potassium acetylide.

15. The process of claim 9 wherein the hydrolysis of 3-lower alkoxy - $17\alpha$ - ethynyl-$10\beta$-propyl-$\Delta^{3,5,9(11)}$-estratriene-$17\beta$-ol is effected in the presence of hydrochloric acid.

16. A process for the preparation of $17\alpha$-ethynyl-$10\beta$-propyl-$\Delta^{4,9(11)}$-estradiene-$17\beta$-ol-3-one which comprises catalytically hydrogenating 3-ethylenedioxy-$17\beta$-benzoyloxy-$10\beta$-allyl-4,5-seco-$\Delta^{9(11)}$-estrene-5-one in the presence of palladized carbon black to form 3-ethylenedioxy-$17\beta$-benzoyloxy-$10\beta$-propyl-4,5-seco-$\Delta^{9(11)}$-estrene-5-one, hydrolyzing the latter in the presence of acetic acid to form $17\beta$-benzoyloxy - $10\beta$ - propyl-4,5-seco-$\Delta^{9(11)}$-estrene-3,5-dione, simultaneously cyclizing and saponifying the latter in the presence of potassium hydroxide in methanol to form $10\beta$-propyl-$\Delta^{4,9(11)}$-estradiene-$17\beta$-ol-3-one, oxidizing the latter with chromium trioxide to form $10\beta$-propyl-$\Delta^{4,9(11)}$-estradiene-3,17-dione, reacting the latter with ethyl orthoformate in the presence of p-toluene sulfonic acid to form 3-ethoxy-$10\beta$-propyl-$\Delta^{3,5,9(11)}$-estratriene-17-one, reacting the latter with potassium acetylide to form 3-ethoxy-$17\alpha$-ethynyl-$10\beta$-propyl-$\Delta^{3,5,9(11)}$-estratriene-$17\beta$-ol, hydrolyzing the latter with hydrochloric acid to form $17\alpha$-ethynyl-$10\beta$-propyl-$\Delta^{4,9(11)}$-estradiene-$17\beta$-ol-3-one and recovering the latter.

References Cited in the file of this patent

UNITED STATES PATENTS

| | | |
|---|---|---|
| 2,816,121 | Gould et al. | Dec. 10, 1957 |
| 2,883,325 | Agnello et al. | Apr. 21, 1959 |
| 2,885,324 | Agnello et al. | May 5, 1959 |

OTHER REFERENCES

Heyl et al.: J.A.C.S., 77 pp., 488–489 (1955).